June 18, 1935.   R. RICHTER   2,005,240
OPTICAL SYSTEM FOR INSTRUMENTS REPRODUCING SOUNDS WITH THE AID OF LIGHT
Filed Aug. 2, 1934
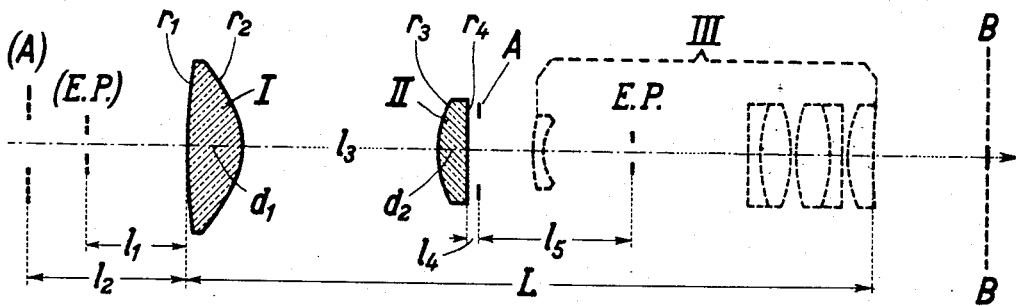
| | I | II |
|---|---|---|
| $r_1 = +59.1$ | $d_1 = 5.5$ | $l_1 = 9.9$ |
| $r_2 = -8.5$ | $l_3 = 29.1$ | $l_2 = 15.9$ |
| $r_3 = +10.7$ | $d_2 = 2.8$ | $l_4 = 1.0$ |
| $r_4 = \infty$ | | $l_5 = 15.3$ |
| | | $L = 87.6$ |
|  | I | II |
|---|---|---|
| $n_d =$ | 1.6396 | 1.5163 |
| $\nu =$ | 48.3 | 64.0 |
Inventor:
Robert Richter Patented June 18, 1935

2,005,240

UNITED STATES PATENT OFFICE 2,005,240

OPTICAL SYSTEM FOR INSTRUMENTS REPRODUCING SOUNDS WITH THE AID OF LIGHT

Robert Richter, Jena, Germany, assignor to the firm of Carl Zeiss, Jena, Germany Application August 2, 1934, Serial No. 738,080
In Germany August 7, 1933

2 Claims. (Cl. 88—24)

An application has been filed in Germany, August 7, 1933.

The optical systems for instruments reproducing sounds with the aid of light have a condenser, a slit and an objective. The condenser projects the light of an electric lamp to the slit, and the objective images this slit on the film provided with the sound image. In the one construction of the known instruments of this kind the slit is illuminated in such a manner that a straight incandescent filament is imaged by the condenser in the slit, and in the other construction of the said instruments a circular or approximately square luminous surface is imaged by the condenser in the entrance pupil of the objective. The condensers are constructed to suit either the one of the other type of instrument, it being impossible to make use of both kinds of illumination in one and the same kind of the known instrument.

According to the present invention, the condenser is so constructed that the one and the other method may be used at discretion in one and the same instrument. To provide that a suitable lamp may be so placed in the instrument as to be imaged by the condenser at option either in the slit or in the entrance pupil of the objective, this condenser is to be such that the plane conjugate to the slit as well as the plane conjugate to the objective are accessible to the light projected by, and lie at the further side of, the said condenser. In other words, the said planes are to be at a practically useful, i. e. not too great a distance from the condenser. On the other hand, the said planes are not to be too near the condenser because, otherwise, suitable lamps may not be correctly positioned. Accordingly, the distance of the planes from the condenser is to be at least 5 millimetres. To illuminate the slit or the entrance pupil of the objective, the incandescent filament of the lamp is to cover the image of the slit or the entrance pupil, which is projected by the condenser. With a view to fulfilling this condition and, in spite thereof, to economizing current by using small lamps, the condenser is to be so designed that the image of the slit has a length of at most 10 millimetres and that the image of the entrance pupil has a diameter of at most 2 millimetres.

The said lamp of small consumption of current and providing a sufficient illumination may be disposed as well between the said two images.

To come up to the requirements of the invention, the condenser conveniently consists of two converging lenses whose distance apart is greater than the focal length of the lens not facing the slit.

The accompanying drawing illustrates on an enlarged scale a longitudinal section through an example of the invention.

In the example represented by the drawing, the condenser consists of the two converging lenses I and II. The slit, which is designated A, has a length of 9 millimetres. The entrance pupil of the objective III, which is represented by dash-lines, is designated E. P. and has a diameter of 2.56 millimetres. The images of the slit and the entrance pupil of the objective III, which are projected by the condenser, are designated (A) and (E. P.), respectively. The image of the slit has a length of 6 millimetres and that of the entrance pupil has a diameter of 1.51 millimetres. The sound image lies in the plane B—B. The decisive values are indicated in the following table (longitudinal measures in millimetres).

| | | |
|---|---|---|
| $r_1 = +59.1$ | $d_1 = 5.5$ | $l_1 = 9.9$ |
| $r_2 = -8.5$ | $l_3 = 29.1$ | $l_2 = 15.9$ |
| $r_3 = +10.7$ | $d_2 = 2.8$ | $l_4 = 1.0$ |
| $r_4 = \infty$ | | $l_5 = 15.3$ |
| | | $L = 87.6$ |

| | $n_d$ | $\gamma$ |
|---|---|---|
| I: | 1.6396 | 48.3 |
| II: | 1.5163 | 64.0 |

All surfaces of the lenses I and II are spherical, the exception being that surface of the lens I which faces the lens II. This latter surface is paraboloidal, its radius of apical curvature being $r_2$. The focal lengths of the lenses I and II are 12.6 and 20.7 millimetres, respectively.

I claim:

1. An optical system for instruments reproducing sounds with the aid of light, comprising a condenser, a slit and an objective, the planes conjugate to the slit and the entrance pupil of the objective relatively to the condenser being at the further side of the condenser and lying at a distance of at least 5 millimetres from the extreme lens apex of this condenser, the slit image projected by the condenser having a length of at most 10 millimetres, and the image of the entrance pupil of the objective, which is projected by the condenser, having a diameter of at most 2 millimetres.

2. In an optical system according to claim 1, the condenser consisting of two converging lenses whose distance apart is greater than the focal length of the lens not facing the slit.

ROBERT RICHTER.